US012293750B2

(12) United States Patent
Bastyr et al.

(10) Patent No.: US 12,293,750 B2
(45) Date of Patent: May 6, 2025

(54) OCCUPANCY BASED ACTIVE NOISE CANCELLATION SYSTEMS

(71) Applicant: HARMAN INTERNATIONAL INDUSTRIES, INCORPORATED, Stamford, CT (US)

(72) Inventors: Kevin J. Bastyr, Franklin, MI (US); Antonio Gomez, Hazel Park, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 91 days.

(21) Appl. No.: 18/019,211

(22) PCT Filed: Aug. 5, 2020

(86) PCT No.: PCT/US2020/044961

§ 371 (c)(1), (2) Date: Feb. 1, 2023

(87) PCT Pub. No.: WO2022/031279

PCT Pub. Date: Feb. 10, 2022

(65) Prior Publication Data

US 2023/0306947 A1 Sep. 28, 2023

(51) Int. Cl.
*G10K 11/178* (2006.01)

(52) U.S. Cl.
CPC .. *G10K 11/17813* (2018.01); *G10K 11/17879* (2018.01); *G10K 2210/1282* (2013.01)

(58) Field of Classification Search
CPC ....... G10K 11/17813; G10K 11/17819; G10K 2210/1282
See application file for complete search history.

(56) References Cited

U.S. PATENT DOCUMENTS 9,348,793 B2 5/2016 Singer et al.
9,870,763 B1 * 1/2018 Christian ............ G10K 11/178
(Continued)

FOREIGN PATENT DOCUMENTS

CN 103985380 A 8/2014
CN 106251855 A 12/2016
(Continued)

OTHER PUBLICATIONS

International Search Report and Written Opinion of PCT/US2020/044961 mailed Apr. 22, 2021, 13 pages.
(Continued)

*Primary Examiner* — Jason R Kurr
(74) *Attorney, Agent, or Firm* — BROOKS KUSHMAN P.C.

(57) ABSTRACT

An active noise cancellation (ANC) system is provided with at least one loudspeaker to project anti-noise sound within a passenger cabin of a vehicle in response to receiving an anti-noise signal. At least one microphone provides an error signal indicative of noise and the anti-noise sound within the passenger cabin. An occupancy controller is programmed to modify a transfer function between the at least one microphone and at least one virtual microphone based on an occupancy signal indicative of occupant presence within the passenger cabin. An adaptive filter controller is programmed to filter the error signal using the transfer function to obtain an estimated virtual microphone error signal. A controllable filter generates the anti-noise signal based on the estimated virtual microphone error signal.

20 Claims, 4 Drawing Sheets

(56) References Cited

U.S. PATENT DOCUMENTS

| | | | | |
|---|---|---|---|---|
| 10,204,616 | B1 | 2/2019 | Malka et al. | |
| 10,425,734 | B2 | 9/2019 | Kano | |
| 2014/0226831 | A1 | 8/2014 | Tzirkel-Hancock et al. | |
| 2015/0256928 | A1 | 9/2015 | Mizuno | |
| 2019/0088246 | A1 | 3/2019 | Siciak et al. | |
| 2019/0304431 | A1* | 10/2019 | Cardinaux | H04R 1/406 |
| 2020/0066246 | A1 | 2/2020 | Von Elling et al. | |
| 2020/0074976 | A1* | 3/2020 | Torres | G10K 11/17853 |
| 2021/0020156 | A1* | 1/2021 | Tachi | G10K 11/17881 |
| 2022/0208168 | A1* | 6/2022 | Aval | G10K 11/17815 |

FOREIGN PATENT DOCUMENTS

| | | | |
|---|---|---|---|
| CN | 108428445 | A | 8/2018 |
| CN | 110111764 | A | 8/2019 |
| CN | 111354331 | A | 6/2020 |
| JP | H04234096 | A | 8/1992 |
| JP | 2007296886 | A | 11/2007 |
| KR | 20190139618 | A | 12/2019 |
| WO | 2017157595 | A1 | 9/2017 |
| WO | 2019232400 | A1 | 12/2019 |

OTHER PUBLICATIONS

Communication pursuant to Article 94(3) EPC of European patent application No. 20760674.0 dated Jun. 26, 2024, 13 pages.

Office Action of Japanese patent application No. 2023-505914 mailed Jul. 3, 2024, 9 pages.

Office Action of Chinese patent application No. 202080104329.6 dated Mar. 14, 2025, 12 pages.

* cited by examiner

| Config | D | FP | RP1 | RP2 | RP3 |
|---|---|---|---|---|---|
| 1A | O | X | X | X | X |
| 2A | O | O | X | X | X |
| 3A | O | O | O | X | X |
| 4A | O | O | O | O | X |
| 5A | O | O | O | O | O |

OCCUPANCY BASED ACTIVE NOISE CANCELLATION SYSTEMS

CROSS-REFERENCE TO RELATED APPLICATION

This application is the U.S. national phase of PCT Application No. PCT/US2020/044961 filed on Aug. 5, 2020, the disclosure of which is hereby incorporated in its entirety by reference herein.

TECHNICAL FIELD

The present disclosure is directed to an active noise cancellation system and, more particularly, to controlling an active noise control framework that includes virtual microphones based on vehicle occupancy.

BACKGROUND

Active Noise Cancellation (ANC) systems attenuate undesired noise using feedforward and feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, reduce the sound pressure level (SPL) at a location. In a vehicle cabin listening environment, potential sources of undesired noise come from the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

A Road Noise Cancellation (RNC) system is a specific ANC system implemented on a vehicle in order to minimize undesirable road noise inside the vehicle cabin. RNC systems use vibration sensors to sense road induced vibration generated from the tire and road interface that leads to unwanted audible road noise. This unwanted road noise inside the cabin is then cancelled, or reduced in level, by using speakers to generate sound waves that are ideally opposite in phase and identical in magnitude to the noise to be reduced at one or more listeners' ears. Cancelling such road noise results in a more pleasurable ride for vehicle passengers, and it enables vehicle manufacturers to use lightweight materials, thereby decreasing energy consumption and reducing emissions.

An Engine Order Cancellation (EOC) system is a specific ANC system implemented on a vehicle in order to minimize undesirable engine noise inside the vehicle cabin. EOC systems use a non-acoustic signal, such as an engine speed sensor, to generate a signal representative of the engine crankshaft rotational speed in revolutions-per-minute (RPM) as a reference. This reference signal is used to generate sound waves that are opposite in phase to the engine noise that is audible in the vehicle interior. Because EOC systems use a signal from an RPM sensor, they do not require vibration sensors.

RNC systems are typically designed to cancel broadband signals, while EOC systems are designed and optimized to cancel narrowband signals, such as individual engine orders. ANC systems within a vehicle may provide both RNC and EOC technologies. Such vehicle-based ANC systems are typically Least Mean Square (LMS) adaptive feed-forward systems that continuously adapt W-filters based on noise inputs (e.g., acceleration inputs from the vibration sensors in an RNC system) and signals of physical microphones located in various positions inside the vehicle's cabin. A feature of LMS-based feed-forward ANC systems and corresponding algorithms is the storage of the impulse response, or secondary path, between each physical microphone and each anti-noise speaker in the system. The secondary path is the transfer function between an anti-noise generating speaker and a physical microphone, essentially characterizing how an electrical anti-noise signal becomes sound that is radiated from the speaker, travels through a vehicle cabin to a physical microphone, and becomes the microphone output signal.

A virtual microphone is a technique in which an ANC system estimates an error signal generated by an imaginary or virtual microphone at a location where no real physical microphone is located, based on the error signals received from one or more real physical microphones. This virtual microphone technique can improve noise cancellation at a listener's ears even when no physical microphone is actually located there.

SUMMARY

In one embodiment an active noise cancellation (ANC) system is provided with at least one loudspeaker to project anti-noise sound within a passenger cabin of a vehicle in response to receiving an anti-noise signal. At least one microphone provides an error signal indicative of noise and the anti-noise sound within the passenger cabin. An occupancy controller is programmed to modify a transfer function between the at least one microphone and at least one virtual microphone based on an occupancy signal indicative of occupant presence within the passenger cabin. An adaptive filter controller is programmed to filter the error signal using the transfer function to obtain an estimated virtual microphone error signal. A controllable filter generates the anti-noise signal based on the estimated virtual microphone error signal.

In another embodiment a method is provided for controlling a virtual microphone (VM) active noise cancellation (ANC) system. An error signal is received from a microphone that is indicative of noise and anti-noise within a vehicle. An occupancy signal is received from an occupancy detector that is indicative of occupant presence within the vehicle. A transfer function between the microphone and a virtual microphone is modified based on the occupancy signal. The error signal is filtered using the transfer function to obtain an estimated virtual microphone error signal. An anti-noise signal to be radiated from a loudspeaker within the vehicle is generated based on the estimated virtual microphone error signal.

In yet another embodiment, an active noise cancellation (ANC) system is provided with an occupancy controller that is configured to modify a transfer function between at least one microphone and at least one virtual microphone based on occupant presence within a passenger cabin of a vehicle. An adaptive filter controller is configured to filter an error signal indicative of noise and anti-noise sound within the passenger cabin using the transfer function to obtain an estimated virtual microphone error signal. The ANC system is also provided with a controllable filter to generate an anti-noise signal based on the estimated virtual microphone error signal and to provide the anti-noise signal to at least one loudspeaker to project anti-noise sound within a passenger cabin of a vehicle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis.

Figure 1:
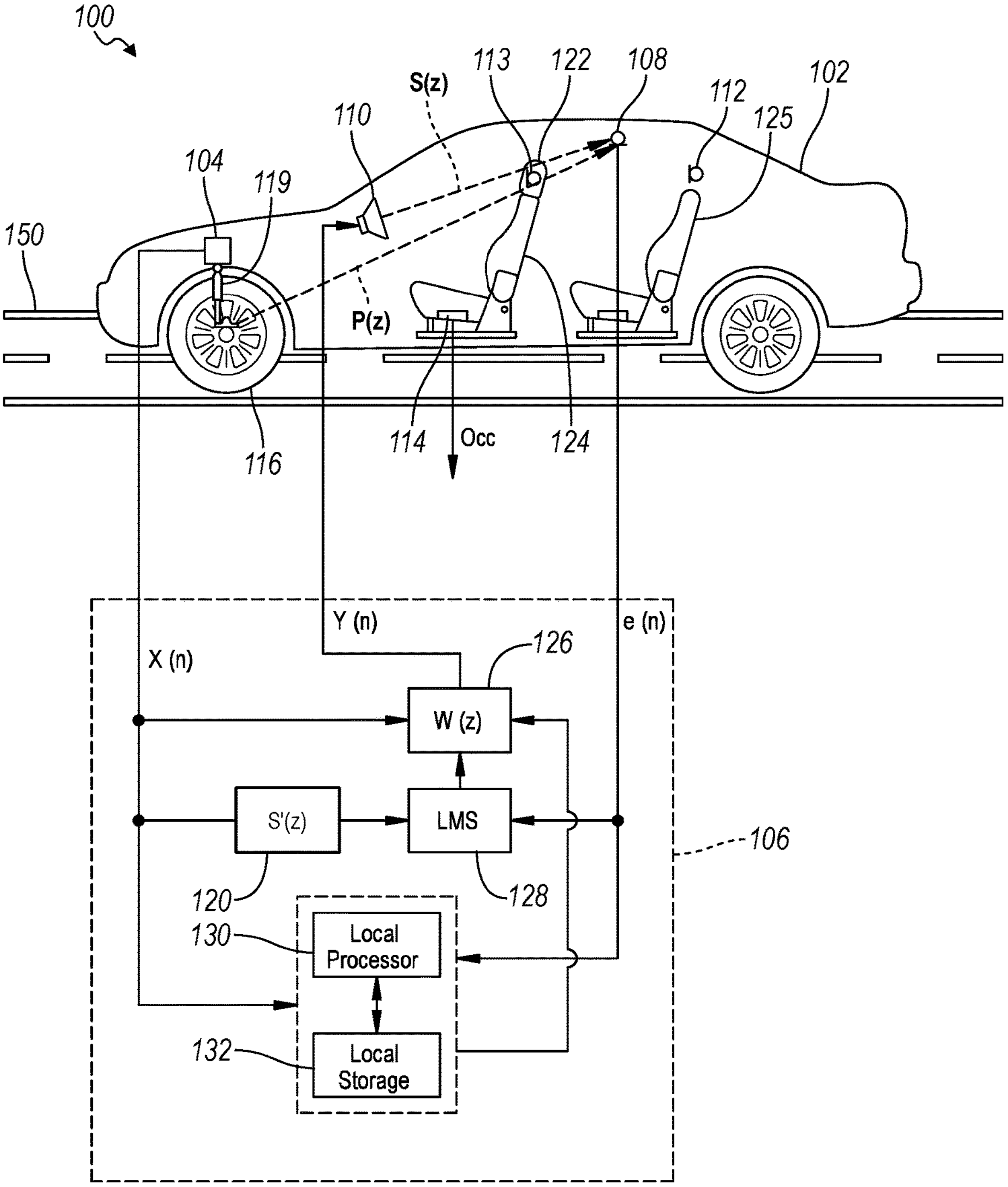
FIG. 1 is an environmental block diagram of a vehicle having an active noise cancellation (ANC) system including a road noise cancellation (RNC), a virtual microphone, and an occupancy detector, in accordance with one or more embodiments.

With reference to FIG. 1, a road noise cancellation (RNC) system is illustrated in accordance with one or more embodiments and generally represented by numeral 100. The RNC system 100 is depicted within a vehicle 102 having one or more vibration sensors 104. The vibration sensors 104 are disposed throughout the vehicle 102 to monitor the vibratory behavior of the vehicle's suspension, subframe, as well as other axle and chassis components. The RNC system 100 may be integrated with a broadband adaptive feed-forward and feedback active noise cancellation (ANC) system 106 that generates anti-noise by adaptively filtering the signals from the vibration sensors 104 using one or more physical microphones 108. The anti-noise signal may then be played through one or more loudspeakers, or speakers 110 to become sound. S(z) represents a transfer function between a single speaker 110 and a single microphone 108. While FIG. 1 shows a single vibration sensor 104, microphone 108, and speaker 110 for simplicity purposes only, it should be noted that typical RNC systems use multiple vibration sensors 104 (e.g., ten or more), microphones 108 (e.g., four to six), and speakers 110 (e.g., four to eight). As described in detail with reference to FIG. 5, the ANC system 106 may also include one or more virtual microphones 112, 113 and one or more occupancy detectors 114 that are used for adapting anti-noise signal(s) that are optimized for the occupants in the vehicle 102 at a given time, according to one or more embodiments.

The vibration sensors 104 may include, but are not limited to, accelerometers, force gauges, geophones, linear variable differential transformers, strain gauges, and load cells. Accelerometers, for example, are devices whose output signal amplitude is proportional to acceleration. A wide variety of accelerometers are available for use in RNC systems. These include accelerometers that are sensitive to vibration in one, two and three typically orthogonal directions. These multi-axis accelerometers typically have a separate electrical output (or channel) for vibration sensed in their X-direction, Y-direction and Z-direction. Single-axis and multi-axis accelerometers, therefore, may be used as vibration sensors 104 to detect the magnitude and phase of acceleration and may also be used to sense orientation, motion, and vibration.

Noise and vibration that originates from a wheel 116 moving on a road surface 118 may be sensed by one or more of the vibration sensors 104 mechanically coupled to a suspension device 119 or a chassis component of the vehicle 102. The vibration sensor 104 may output a noise signal X(n), which is a vibration signal that represents the detected road-induced vibration. It should be noted that multiple vibration sensors are possible, and their signals may be used separately, or may be combined. In certain embodiments, a microphone may be used in place of a vibration sensor to output the noise signal X(n) indicative of noise generated from the interaction of the wheel 116 and the road surface 118. The noise signal X(n) may be filtered with a modeled transfer characteristic S'(z), which estimates the secondary path (i.e., the transfer function between an anti-noise speaker 110 and a physical microphone 108), by a secondary path filter 120.

Road noise that originates from the interaction of the wheel 116 and the road surface 118 is also transferred, mechanically and/or acoustically, into the passenger cabin and is received by the one or more microphones 108 inside the vehicle 102. The one or more microphones 108 may, for example, be located in a headliner of the vehicle 102, or in some other suitable location to sense the acoustic noise field heard by occupants inside the vehicle 102, such as an occupant sitting on a rear seat 125. The road noise originating from the interaction of the road surface 118 and the wheel 116 is transferred to the microphone 108 according to a transfer characteristic P(z), which represents the primary path (i.e., the transfer function between an actual noise source and a physical microphone).

The microphone 108 may output an error signal e(n) representing the sound present in the cabin of the vehicle 102 as detected by the microphone 108, including noise and anti-noise. In the RNC system 100, an adaptive transfer characteristic W(z) of a controllable filter 126 may be controlled by adaptive filter controller 128, which may operate according to a known least mean square (LMS) algorithm based on the error signal e(n) and the noise signal X(n) filtered with the modeled transfer characteristic S'(z) by the filter 120. The controllable filter 126 is often referred to as a W-filter. An anti-noise signal Y(n) may be generated by an adaptive filter formed by the controllable filter 126 and the adaptive filter controller 128 based on the identified transfer characteristic W(z) and the vibration signal, or a combination of vibration signals X(n). The anti-noise signal Y(n) ideally has a waveform such that when played through the speaker 110, anti-noise is generated near the occupants' cars and the microphone 108 that is substantially opposite in phase and identical in magnitude to that of the road noise audible to the occupants of the vehicle cabin. The anti-noise from the speaker 110 may combine with road noise in the vehicle cabin near the microphone 108 resulting in a reduction of road noise-induced sound pressure levels (SPL) at this location. In certain embodiments, the RNC system 100 may receive sensor signals from other acoustic sensors in the passenger cabin, such as an acoustic energy sensor, an acoustic intensity sensor, or an acoustic particle velocity or acceleration sensor to generate error signal e(n).

While the vehicle 102 is under operation, a processor 130 may collect and optionally process the data from the vibration sensor(s) 104 and the microphone(s) 108 to construct and/or modify a database or map containing data and/or parameters to be used by the vehicle 102. The data collected may be stored locally at a storage 132, or in the cloud, for future use by the vehicle 102. Examples of the types of data related to the RNC system 100 that may be useful to store locally at storage 132 include, but are not limited to, occupancy configuration data related to: secondary paths, the transfer function between the physical and virtual microphone location H(z), preferred physical microphone sets, and preferred speaker sets. In one or more embodiments, the processor 130 and storage 132 may be integrated with one or more RNC system controllers, such as the adaptive filter controller 128.

As previously described, typical RNC systems may use several vibration sensors, microphones and speakers to sense structure-borne vibratory behavior of a vehicle and generate anti-noise. The vibration sensor may be multi-axis accelerometers having multiple output channels. For instance, triaxial accelerometers typically have a separate electrical output for vibration sensed in their X-direction, Y-direction, and Z-direction. A typical configuration for an RNC system may have, for example, six physical microphones, six speakers, and twelve channels of acceleration signals coming from four triaxial accelerometers or six dual-axis accelerometers. Therefore, the RNC system will also include multiple S'(z) filters (i.e., secondary path filters 120) and multiple W(z) filters (i.e., controllable filters 126).

The simplified RNC system schematic depicted in FIG. 1 shows one secondary path, represented by S(z), between the speaker 110 and the microphone 108. As previously mentioned, RNC systems typically have multiple speakers, microphones and vibration sensors. Accordingly, a six-speaker, six-microphone RNC system will have thirty-six total secondary paths (i.e., 6×6). Correspondingly, the six-speaker, six-microphone RNC system may likewise have thirty-six S'(z) filters (i.e., secondary path filters 120), which estimate the transfer function for each secondary path. As shown in FIG. 1, an RNC system will also have one W(z) filter (i.e., controllable filter 126) between each noise signal X(n) from a vibration sensor (i.e., accelerometer) 104 and each speaker 110. Accordingly, a twelve-accelerometer signal, six-speaker RNC system may have seventy-two W(z) filters. The relationship between the number of accelerometer signals, speakers, and W(z) filters is illustrated in FIG. 2.

Figure 2:
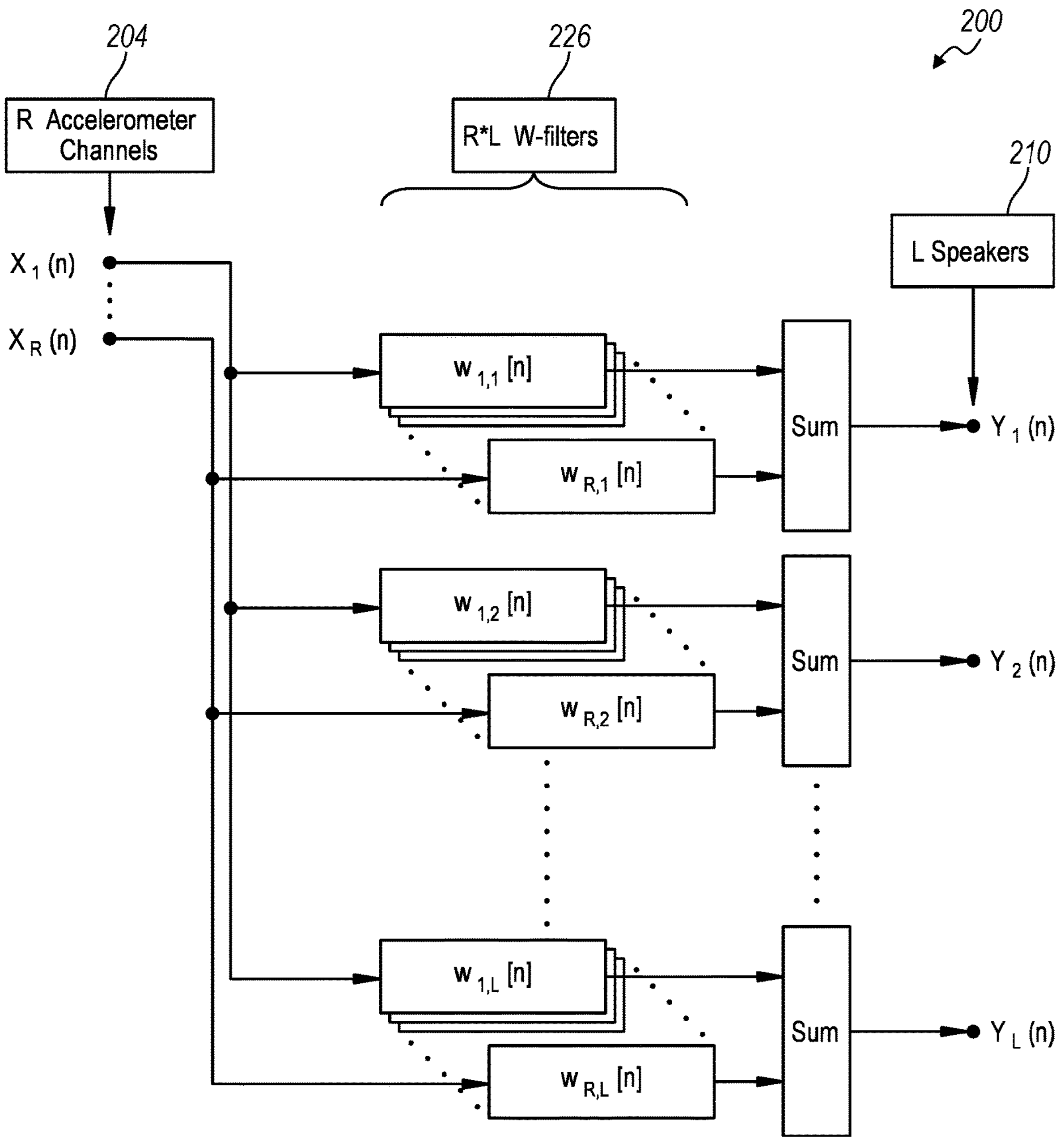
FIG. 2 is a sample schematic diagram demonstrating relevant portions of an RNC system scaled to include R accelerometer signals and L speaker signals.

FIG. 2 is a sample schematic diagram demonstrating relevant portions of an RNC system 200 scaled to include R accelerometer signals [$X_1(n)$, $X_2(n)$, . . . . $X_R(n)$] from accelerometers 204 and L speaker signals [$Y_1(n)$, $Y_2(n)$, . . . $Y_L(n)$] from speakers 210. Accordingly, the RNC system 200 may include R*L controllable filters (or W-filters) 226 between each of the accelerometer signals and each of the speakers. As an example, an RNC system having twelve accelerometer outputs (i.e., R=12) may employ six dual-axis accelerometers or four triaxial accelerometers. In the same example, a vehicle having six speakers (i.e., L=6) for reproducing anti-noise, therefore, may use seventy-two W-filters in total. At each of the L speakers, R W-filter outputs are summed to produce the speaker's anti-noise signal Y(n). Each of the L speakers may include an amplifier (not shown). In one or more embodiments, the R accelerometer signals filtered by the R W-filters are summed to create an electrical anti-noise signal y(n), which is fed to the amplifier to generate an amplified anti-noise signal Y(n) that is sent to a speaker.

The ANC system 106 illustrated in FIG. 1 may also include an engine order cancellation (EOC) system. As mentioned above, EOC technology uses a non-acoustic signal such as an engine speed signal representative of the engine crankshaft rotational speed as a reference in order to generate sound that is opposite in phase to the engine noise audible in the vehicle interior. EOC systems may utilize a narrowband feed-forward ANC framework to generate anti-noise using an engine speed signal to guide the generation of an engine order signal identical in frequency to the engine order to be cancelled, and adaptively filtering it to create an anti-noise signal. After being transmitted via a secondary path from an anti-noise source to a listening position or physical microphone, the anti-noise ideally has the same amplitude, but opposite phase, as the combined sound generated by the engine and exhaust pipes after being filtered by the primary paths that extend from the engine to the listening position and from the exhaust pipe outlet to the listening position or physical or virtual microphone position. Thus, at the place where a physical microphone resides in the vehicle cabin (i.e., most likely at or close to the listening position), the superposition of engine order noise and anti-noise would ideally become zero so that acoustic error signal received by the physical microphone would only record sound other than the (ideally cancelled) engine order or orders generated by the engine and exhaust.

Commonly, a non-acoustic sensor, for example an engine speed sensor, is used as a reference. Engine speed sensors may be, for example, Hall Effect sensors which are placed adjacent to a spinning steel disk. Other detection principles can be employed, such as optical sensors or inductive sensors. The signal from the engine speed sensor can be used as a guiding signal for generating an arbitrary number of reference engine order signals corresponding to each of the engine orders. The reference engine orders form the basis for noise cancelling signals generated by the one or more narrowband adaptive feed-forward LMS blocks that form the EOC system.

Figure 3:
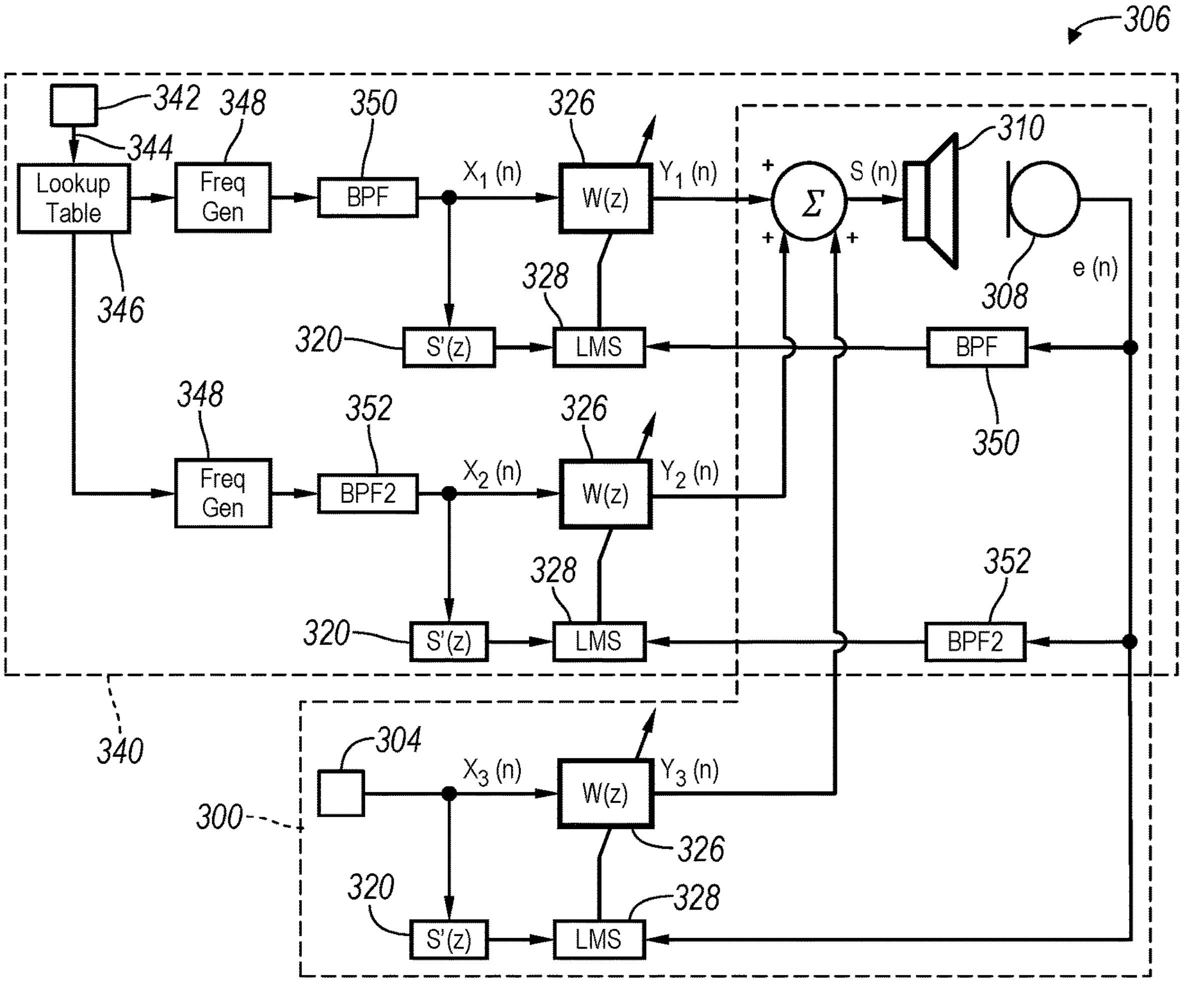
FIG. 3 is a sample schematic block diagram of an ANC system including an engine order cancellation (EOC) system and an RNC system.

FIG. 3 is a schematic block diagram illustrating an example of an ANC system 306, including both an RNC system 300 and an EOC system 340. Similar to RNC system 100, the RNC system 300 may include a vibration sensor 304, physical microphone 308, w-filter 326, adaptive filter controller 328, secondary path filter 320, and speaker 310, consistent with operation of the vibration sensor 104, physical microphone 108, w-filter 126, adaptive filter controller 128, secondary path filter 120, and speaker 110, respectively, discussed above.

The EOC system 340 may include an engine speed sensor 342, which may provide an engine speed signal 344 (e.g., a square-wave signal) indicative of rotation of an engine crank shaft or other rotating shaft such as the drive shaft, half shafts or other shafts whose rotational rate is aligned with vibrations coupled to vehicle components that lead to noise in the passenger cabin. In some embodiments, the engine speed signal 344 may be obtained from a vehicle network bus (not shown). As the radiated engine orders are directly proportional to the crank shaft RPM, the engine speed signal 344 is representative of the frequencies produced by the engine and exhaust system. Thus, the signal from the engine speed sensor 342 may be used to generate reference engine order signals corresponding to each of the engine orders for the vehicle. Accordingly, the engine speed signal 344 may be used in conjunction with a lookup table 346 of Engine Speed (RPM) vs. Engine Order Frequency, which provides a list of engine orders radiated at each engine speed. The adaptive filter controller 328 may take as an input the Engine Speed (RPM) and generate a sine wave for each order based on this lookup table 346.

The frequency of a given engine order at the sensed Engine Speed (RPM), as retrieved from the lookup table 346, may be supplied to a frequency generator 348, thereby generating a sine wave at the given frequency. This sine wave represents a noise signal X(n) indicative of engine order noise for a given engine order. Similar to the RNC system 300, this noise signal X(n) from the frequency generator 348 may be sent to an adaptive controllable filter 326, or W-filter, which provides a corresponding anti-noise signal Y(n) to the loudspeaker 310. As shown, various components of this narrow-band, EOC system 340 may be identical to the broadband RNC system 300, including the physical microphone 308, adaptive filter controller 328 and secondary path filter 320. The anti-noise signal Y(n), broadcast by the speaker 310 generates anti-noise that is substantially out of phase but identical in magnitude to the actual engine order noise at the location of a listener's ear, which may be in close proximity to a physical microphone 308, thereby reducing the sound amplitude of the engine order. Because engine order noise is narrow band, the error signal e(n) may be filtered by a bandpass filter 350 prior to passing into the LMS-based adaptive filter controller 328. In an embodiment, proper operation of the LMS adaptive filter controller 328 is achieved when the noise signal X(n) output by the frequency generator 348 is bandpass filtered using the same bandpass filter parameters.

In order to simultaneously reduce the amplitude of multiple engine orders, the EOC system 340 may include multiple frequency generators 348 for generating a noise signal X(n) for each engine order based on the Engine Speed (RPM) signal 344. As an example, FIG. 3 shows a two order EOC system having two such frequency generators for generating a unique noise signal (e.g., $X_1$(n), $X_2(n)$, etc.) for each engine order based on engine speed. Because the frequency of the two engine orders differ, the bandpass filters 350 (labeled BPF and BPF2) have different high- and low-pass filter corner frequencies. The number of frequency generators and corresponding noise-cancellation components will vary based on the number of engine orders to be cancelled for a particular engine of the vehicle. As the two-order EOC system 340 is combined with the RNC system 300 to form the ANC system 306, the anti-noise signals Y(n) output from the three controllable filters 326 are summed and sent to the speaker 310 as a speaker signal S(n). Similarly, the error signal e(n) from the physical microphone 308 may be sent to the three LMS adaptive filter controllers 328.

Noise cancellation performance degradation, noise gain, or actual instability may result if the modeled transfer characteristic S'(z), representing an estimate of the secondary path, that is stored in the ANC system does not match the actual secondary path of the system. As previously discussed, the secondary path is the transfer function between an anti-noise generating speaker and a physical microphone. Accordingly, it essentially characterizes how the electrical anti-noise signal Y(n) becomes sound that is radiated from the speaker, travels through the car cabin to the physical microphone, and becomes part of the microphone output or error signal e(n) in the ANC system. The actual secondary path S(z) may deviate from the stored secondary path model S'(z), which is typically measured on a "golden system" by trained engineers, when a vehicle becomes substantially different from the reference vehicle or system in terms of geometry, passenger count, luggage loading, or the like. In an embodiment, a vehicle with occupancy detection can select the appropriate set of secondary paths from a predetermined stored database in order to improve the noise cancellation system performance.

ANC systems generate anti-noise that is ideally opposite in phase and identical in magnitude to the noise to be reduced at one or more listeners' ears. Existing ANC systems often generate a zone of reduced noise ("quiet zone") that is centered around the physical microphone position(s). The size of the quiet zone is approximately one tenth of an acoustic wavelength, resulting in a small quiet zone that decreases in size for increasing frequency. If only one physical microphone is used for a vehicle application, then there will be a steep gradient of performance as one moves their ear away from the microphone, especially once the ear is greater than one-tenth of a wavelength away. Further, for a system including one physical microphone, it is likely that the sound pressure level in all other locations of the vehicle will increase. To avoid this "noise boosting" at the location of a first or second vehicle occupant, four or six physical microphones may be used so that the active system reduces the noise field more uniformly throughout the cabin. In order to obtain the maximum perceived noise cancellation, the physical microphones would ideally be mounted at the occupants' ear locations. However, in many practical cases, the physical microphones cannot be placed close to all vehicle passenger's ears. This is due to vehicle packaging limitations, such as convertible tops, sunroofs, and the absence of seat mounted microphones, all of which may make it difficult to achieve maximum noise field reduction where it matters the most, at the locations of the vehicle passenger's ears.

Referring back to FIG. 1, the vehicle 102 includes a physical microphone 108 that is located within a headliner. The physical microphone 108 is not located proximate to the ears of an occupant sitting on the rear seat 125. However, the ANC system 106 includes a virtual microphone 112 that is located proximate to the ears of an occupant sitting on the rear seat 125.

A virtual microphone is a technique in which an ANC system estimates an error signal generated by an imaginary or virtual microphone at a location where no real physical microphone is located based on the error signals received from one or more real physical microphones. This virtual microphone technique can improve noise cancellation at the locations of the passenger's ears even when no physical microphone is actually located there. An additional benefit is that this virtual microphone technique provides a flexible solution of physical microphone mounting locations. Compared with the conventional, non-virtual noise cancellation algorithm, the virtual microphone algorithm utilizes an estimated virtual signal as an error signal $e_v$(n). Based on the virtual error signal estimate, the virtual microphone algorithm will adapt the W-filters based on the estimated virtual error signal instead of the physical error signal. Hence, the noise cancellation system performance is maximized at the location of these virtual microphones, which are ideally close to the actual positions of the listener's ears, rather than at the location of the physical microphones, which may be far from the listener's ears, e.g., on the vehicle headliner. A vehicle with a headrest mounted microphone may benefit from the virtual microphone technique, because a virtual microphone can be located closer to the occupant's ears than the headrest mounted microphone.

Figure 4:
FIG. 4 is a table of different vehicle occupancy configurations.

With reference to FIG. 4, a vehicle may allow for multiple different vehicle occupancy configurations, making it difficult for an ANC system to determine the location of the vehicle passengers' ears. FIG. 4 is a table 400 illustrating different occupancy configurations for a vehicle having five seats: a driver seat (D), a front-passenger seat (FP), a first rear-passenger seat (RP1), a second rear-passenger seat (RP2), and a third rear-passenger seat (RP3). Such a vehicle may include one first configuration (1A) with a single occupant, multiple second configurations (2A-2D) with two occupants, multiple third configurations (3A-3X) with three occupants, multiple fourth configurations (4A-4X) with four occupants, and one fifth configuration (5A) with five occupants. In the first configuration (1A), the driver seat (D) is occupied (0), but all passenger seats are not occupied (X). In a first second configuration 2A (shown in FIG. 4), the driver seat (D) and the front passenger seat (FP) are occupied. In a third second configuration 2C (not shown), the driver seat (D) and the second rear passenger seat (RP2) are occupied. A virtual microphone positioned at the ears of a passenger sitting in the front passenger seat (FP) would not be optimal for a passenger sitting in the second rear-passenger seat (RP2), and vice versa.

An ANC system may include many speakers that can radiate anti-noise to the passengers, but can only generate a limited number of anti-noise signals at a time due to system hardware or software limitations, such as digital signal processor (DSP) chip million instructions per second (MIPS) limitations and algorithm output channel limitations. Speakers in close proximity to the front seat passengers may be more effective in radiating anti-noise to the front seat passengers, resulting in superior noise cancellation than would result if distal speakers radiated anti-noise to the front seat passengers. In this occupancy case, more front seat speakers can be employed to radiate anti-noise, and fewer speakers located closer to empty rear seats can be used to radiate anti-noise.

Additionally, an ANC system may include many physical microphones mounted in the vehicle, however there may be limitations on the number of physical microphone channels that the system can use simultaneously due to ADC, or amplifier/algorithm/DSP chip MIPS limitations, or other design constraints. When only the front seat is occupied, additional microphones near the front seat passengers may be selected to output their noise signals e(n) into the noise cancellation algorithm, in place of one or more microphones closer to the unoccupied (rear) seats, in an effort to provide optimal noise cancellation for the occupied seats.

Similarly, though there may be many accelerometer (noise) reference channels, only a smaller number may be simultaneously employed by the noise cancellation system due to hardware input or MIPS limitations. When only the front seat is occupied, additional reference signals from the front portion of the vehicle may be used in place of one or more reference signals originating from the rear portion of the vehicle. In one or more embodiments, reference signals from sensors having the highest coherence with the physical microphones or virtual microphones closest to the occupied seats are selected, irrespective of their proximity to the occupied seats.

Referring back to FIG. 1, the vehicle 102 includes an occupancy detector 114 that provides an occupancy signal (Occ) that indicates whether or not the front seat 124 is occupied. Although one occupancy detector 114 is illustrated in FIG. 1, the ANC system 106 may include one occupancy detector 114 for each seat, or other numbers of occupancy detectors. The occupancy detector 114 may include numerous sensors and/or techniques, such as a seat belt sensor, a seat sensor, a proximity sensor, load-cell, motion sensor, a camera with a machine vision system, a camera with facial recognition or infrared (IR) imaging functionality, a passive infrared (PIR) sensor, or IR or near-IR sensors to detect the heat signature. In one embodiment, the occupancy detector 114 may include a microphone or microphone array that is adapted to act as an occupancy sensor, and optionally coupled with an adaptive beamformer. The ANC system 106 may allow a user to manually enter occupancy information via a user interface, e.g., a button or touch-screen option.

The ANC system 106 may use a variety of methods including sensors, sensory arrays, sensor fusion, speech recognition to detect which vehicle seats are occupied. Then the ANC system 106 selects the optimal noise cancellation tuning using a combination of physical microphones, virtual microphones, accelerometer sensors, physical and virtual secondary paths, transfer functions, tuning parameters, and speakers for a given occupancy configuration. In one embodiment, the ANC system 106 includes a camera (not shown), or other equipment to determine the virtual microphone locations using a head tracking technique to determine the location of an occupant's ear canal openings.

An ANC system may achieve optimal performance when the location of each of the occupants' ears in 3-dimensional space is coincident with a virtual microphone. An ANC system may achieve improved performance over a traditional, non-virtual microphone technique when the location of the virtual microphone is closer to the ear positions than are the physical microphones. Other techniques for the selection of the virtual microphone locations include the use of seat position encoders. An ANC system may use the data of the current seat position to estimate the location of the seat occupant's ears in three dimensions to select the closest virtual microphone location to the occupant's ears, e.g., by selecting a low virtual microphone location for a forward seat position, and a high virtual microphone location for a rearward seat position. The virtual microphone locations may be predetermined by the ANC system tuning engineers at the time of ANC system tuning, and so the selection of virtual microphone locations involves determining which virtual microphones are closest to the ear locations in 3-dimensional space.

Figure 5:
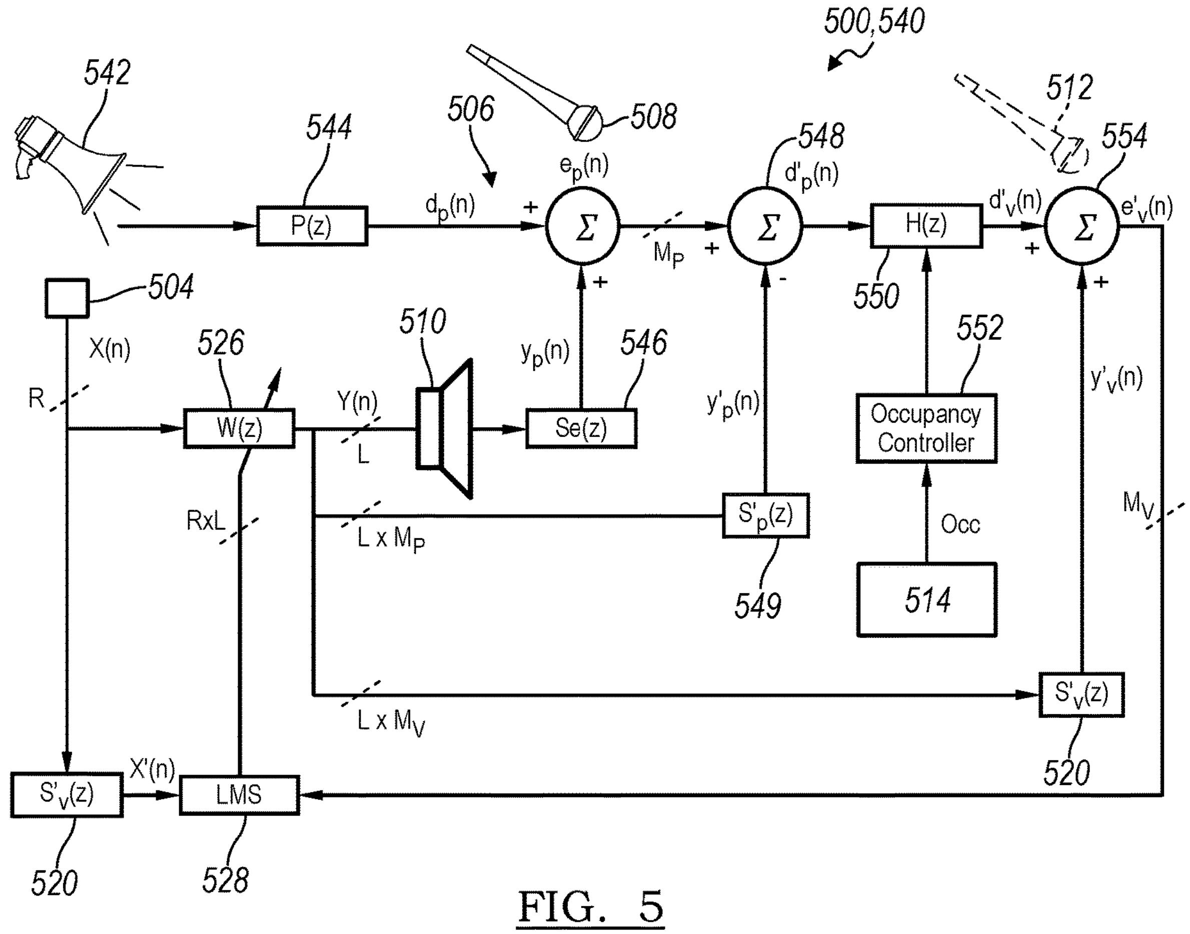
FIG. 5 is a schematic block diagram representing a virtual microphone ANC system including an occupancy controller, in accordance with one or more embodiments.

FIG. 5 is a schematic block diagram of a vehicle-based virtual microphone (VM) ANC system 506 showing many of the key ANC system parameters that may be used to estimate virtual microphone error signals based on vehicle occupancy to optimize ANC system performance. For ease of explanation, the VM ANC system 506 illustrated in FIG. 5 is shown with components and features of an RNC system 500 and an EOC system 540. Accordingly, the VM ANC system 506 is a schematic representation of an RNC and/or EOC system, such as those described in connection with FIGS. 1-3, featuring additional system components of the VM ANC system 506 including a virtual microphone 512 and an occupancy detector 514. Similar components may be numbered using a similar convention. For instance, similar to ANC system 106, the ANC system 506 may include a vibration sensor 504, a physical microphone 508, a w-filter 526, an adaptive filter controller 528, a virtual secondary path filter 520, and a speaker 510, consistent with operation of the vibration sensor 104, the physical microphone 108, the w-filter 126, the adaptive filter controller 128, the secondary path filter 120, and the speaker 110, respectively, discussed above. FIG. 5 also shows the primary path P(z) and secondary path S(z), as described with respect to FIG. 1, in block form for illustrative purposes.

The physical microphone 508 provides an error signal $e_p(n)$ that includes all the sound present at its location, such as the disturbance signal $d_p(n)$ intended to be cancelled, which includes road noise, engine and exhaust noise, plus the anti-noise from the speaker 510, $y_p(n)$, and any extraneous sounds at the microphone location.

The virtual microphone 512 represents a microphone located at a virtual microphone location that would similarly sense all the sound at its location, such as the disturbance signal $d_v(n)$ to be cancelled, which includes road noise, engine, and exhaust noise, plus the anti-noise from the speaker 510 $y_v(n)$, and extraneous sounds. Typically, there are multiple physical microphone locations, and multiple virtual microphone locations. Note that when operating the noise cancellation system, there is no actual microphone mounted at the location of the virtual microphone. So, with the virtual microphone technique, the pressure at the virtual microphone locations is estimated from the pressure at the physical microphone locations to form an estimated error signal $e'_v(n)$.

The physical microphone 508 senses both the noise at its location $d_p(n)$ from a noise source 542 after traveling along a primary path P(z) 544 and the anti-noise at its location $y_p(n)$ from the speaker 510 after traveling along a secondary path Se(z) 546. The physical microphone 508 provides a physical error signal $e_p(n)$, as shown by Equation 1:

$$e_p(n)=d_p(n)+y_p(n) \tag{1}$$

The VM ANC system 506 estimates the disturbance noise to be cancelled $d'_p(n)$ at the physical microphone location at block 548. The VM ANC system 506 subtracts an estimate of the anti-noise at the physical microphone location $y'_p(n)$ from the physical error signal $e_p(n)$ to estimate the disturbance noise at the physical microphone location $d'_p(n)$, as shown by Equation 2:

$$d'_p(n)=e_p(n)-y'_p(n) \tag{2}$$

The VM ANC system 506 then estimates the disturbance noise to be cancelled at the virtual microphone location $d'_v(n)$ at block 550 by convolving the estimated disturbance noise at the physical microphone location $d'_p(n)$ with the transfer function between the physical and virtual microphone location H(z) 550. The VM ANC system 506 includes an occupancy controller 552 that receives the occupancy signals (Occ) from the occupancy detectors 514 and adjusts tuning parameters, such as: H-filters, secondary paths, primary error signals, virtual error signals, speaker noise signals, and reference noise signals, based on the current occupancy configuration of the vehicle. For example, a gain can be added to a physical or virtual error signal located near an occupied seat, relative to a physical or virtual error signal from near an unoccupied seat. Similarly, the VM ANC system 506 may add attenuation to a physical or virtual error signal near an unoccupied seat or seats. This will lead the LMS system 528 to adapt the W-filters 526 to increase the noise cancellation in the region of the vehicle interior near the occupied seat.

At block 554, the VM ANC system 506 estimates the virtual microphone error signal $e'_v(n)$ that would be present at the virtual microphone by adding the estimated disturbance noise to be cancelled at the virtual microphone location $d'_v(n)$ with an estimate of the anti-noise at this location $y'_v(n)$ as shown by Equation 3:

$$e'_v(n)=d'_v(n)+y'_v(n) \tag{3}$$

Combining Equations 1, 2 and 3 creates an estimate of the virtual error microphone signal from the physical error signal, the physical and virtual microphone secondary path and the transfer function between the physical and virtual locations.

Similar to FIG. 1, the noise signal X(n) from the noise input, such as vibration sensor 504, may be filtered with a modeled transfer characteristic $S'_v(z)$, using stored estimates of the virtual secondary path as previously described, by the virtual secondary path filter 520 to obtain a filtered noise signal X'(n). Moreover, a transfer characteristic W(z) of the controllable filter 526 (e.g., a W-filter) may be controlled by the LMS adaptive filter controller (or simply LMS controller) 528 to provide an adaptive filter. The LMS adaptive filter controller 528 receives the filtered noise signal X'(n) and the estimated virtual error signal $e'_v(n)$ to adapt the W-filters to produce optimized noise cancellation at the location of the virtual microphone. The controllable filter 526 generates the anti-noise signal Y(n) based on the output of the LMS controller 528 and the noise signal X(n).

Similar to FIG. 2, the VM ANC system 506 is scaled to include R accelerometer signals, L loudspeaker or speaker signals, and M microphone error signals. Accordingly, the VM ANC system 506 may include R*L controllable filters (or W-filters) 526 and L*M anti-noise signals.

Figure 6:
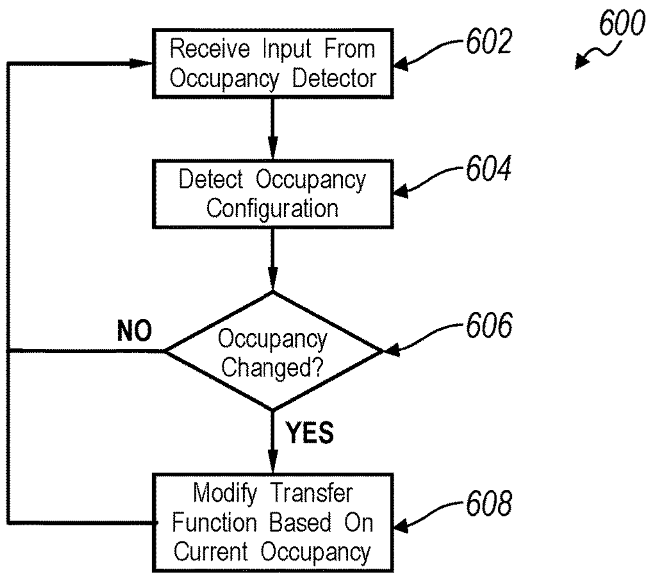
FIG. 6 is a flowchart depicting a method for adjusting virtual microphone parameters based on vehicle occupancy in a virtual microphone ANC system, in accordance with one or more embodiments.

FIG. 6 is a flowchart depicting a method 600 for adjusting virtual microphone system parameters based on vehicle occupancy in a virtual microphone ANC system, in accordance with one or more embodiments of the present disclosure. Various steps of the disclosed method may be carried out by the adaptive filter controller 528 either alone, or in combination with other components of the VM ANC system 506.

At step 602, the VM ANC system 506 receives input from the occupancy detectors 514 that indicates which vehicle seats are occupied. Then at step 604 the occupancy controller 552 determines an occupancy configuration, e.g., one of the configurations shown in FIG. 4, based on the input. At step 606, the VM ANC system 506 compares the occupancy configuration to the last saved occupancy configuration, to determine if the occupancy configuration has changed. If the configuration has not changed, the VM ANC system 506 returns to step 602. If the configuration has changed, the VM ANC system 506 proceeds to step 608 and adjusts one or more VM ANC system parameters.

At step 608, the VM ANC system 506 adjusts the anti-noise signal Y(n) provided to one or more speakers 510 based on the current occupancy configuration. The occupancy controller 552 may include predetermined stored data that is indicative of optimum transfer function parameters, such as H-filters, for each occupancy configuration based on hardware and software limitations of the system 506. The transfer function may include one or more virtual microphone transfer functions H(z) 550, one or more physical microphone transfer functions, or a combination of both virtual and physical microphone transfer functions. In one embodiment, a set of virtual microphones, physical microphones, speakers, noise signals, virtual secondary paths, physical secondary paths, physical or virtual microphone gains, accelerometer gains, other LMS system tuning parameters, and H(z) transfer functions is stored in a database for each occupancy configuration, and the VM ANC system 506 selects the complete set of parameters from the database at step 608. In another embodiment, the database stores only a subset of the aforementioned VM ANC system parameters.

Many of the parameters in the VM ANC system 506 are linked together and therefore the VM ANC system 506 may change multiple parameters in tandem at step 608. In one embodiment, if the VM ANC system 506 modifies the configuration of virtual microphones 512, then it also modifies the virtual secondary path $S'_v(z)$ 520 and the microphone transfer function H(z) 550 based on the modified configuration. In another embodiment, if the VM ANC system 506 modifies the configuration of the physical microphones 508, then it also modifies the physical secondary path $S'_p(z)$ 549 and the microphone transfer function H(z) 550 based on the modified configuration. In another embodiment, the VM ANC system 506 uses multiple copies of the same physical error signal $e_p(n)$ in place of certain 'deactivated' error signals. In another embodiment, if the VM ANC system 506 modifies the configuration of the speakers 510, then it also modifies the physical secondary path $S'_p(z)$ 549 and the virtual secondary path $S'_v(z)$ 520 based on the modified configuration. In an embodiment, at the VM ANC system 506 modifies the configuration of the noise signals X(n), then it also resets or modifies the W-filters 526 based on the modified configuration.

In one or more embodiments, when the vehicle is in a less than fully occupied configuration, the VM ANC system 506 selects more virtual microphones near the occupied seats in order to improve the noise cancellation in the occupied seats in part by not overly constraining the system to provide noise cancellation in unoccupied regions of the vehicle. In an embodiment more than one virtual microphone location around each seat's headrest is chosen, and the relevant transfer functions, $S'_v(z)$ and H(z) are stored for each speaker and physical microphone in the system. In an embodiment with only one occupant, all eight virtual microphone $e'_v(n)$ signals input into LMS block 528 are in close proximity to the driver, at positions surrounding the occupant's head.

Although the VM ANC system 506 is described with reference to a virtual microphone, other embodiments of the ANC system include a remote microphone (RM) to provide a RM ANC system. A remote microphone differs from a virtual microphone in the value of the transfer function H(z). A VM ANC system 506 includes an H(z) with a value of unity, or one, meaning that any difference in the disturbance signal to be cancelled between the physical and virtual locations is simply ignored. A RM ANC system includes a transfer function H(z) that is not equal to unity, meaning that the difference in the disturbance signal to be cancelled between the physical and virtual locations is accounted for. The various embodiments described herein using the term virtual microphone system or technique are all applicable to the remote microphone technique, with the one alteration being the value of H(z).

Although the ANC system is described with reference to a vehicle, the techniques described herein are applicable to non-vehicle applications. For example, a room may have fixed seats which define a listening position at which to quiet a disturbing sound using reference sensors, error sensors, speakers and an LMS adaptive system. Note that the disturbance noise to be cancelled is likely of a different type, such as HVAC noise, or noise from adjacent rooms or spaces. Further, a room may have occupants whose position varies with time, and the seat sensors or head tracking techniques described herein must then be relied upon to determine the position of the listener or listeners so that the 3-dimensional location of the virtual microphones can be selected.

Although FIGS. 1, 3, and 5 show LMS-based adaptive filter controllers 128, 328, and 528, respectively, other methods and devices to adapt or create optimal controllable W-filters 126, 326, and 526 are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

For example, the steps recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments.

What is claimed is:

1. An active noise cancellation (ANC) system comprising:

at least one loudspeaker to project anti-noise sound within a passenger cabin of a vehicle in response to receiving an anti-noise signal;

at least one microphone to provide an error signal indicative of noise and the anti-noise sound within the passenger cabin;

an occupancy controller programmed to:

modify a transfer function between the at least one microphone and at least one virtual microphone based on an occupancy signal indicative of occupant presence within the passenger cabin, and increase a gain associated with the at least one virtual microphone in response to an occupant being proximate to the at least one virtual microphone;

an adaptive filter controller programmed to filter the error signal using the transfer function to obtain an estimated virtual microphone error signal; and a controllable filter to generate the anti-noise signal based on the estimated virtual microphone error signal.

2. The ANC system of claim 1, wherein the at least one microphone comprises at least two microphones, and wherein the adaptive filter controller is further programmed to:

select one of the at least two microphones based on the occupancy signal; and filter the error signal from the selected microphone using the transfer function to obtain the estimated virtual microphone error signal.

3. The ANC system of claim 1, wherein the at least one loudspeaker comprises at least two loudspeakers, and wherein the adaptive filter controller is further programmed to:

select one of the at least two loudspeakers based on the occupancy signal; and generate the anti-noise signal to be radiated from the selected loudspeaker within the vehicle based on the estimated virtual microphone error signal.

4. The ANC system of claim 1, wherein the adaptive filter controller is further programmed to determine a location of the at least one virtual microphone using a head tracking technique.

5. The ANC system of claim 1 wherein the adaptive filter controller is further programmed to determine a location of the at least one virtual microphone based on a seat position.

6. The ANC system of claim 1 further comprising:

at least one sensor to provide a non-acoustic noise signal;

a second secondary path filter configured to filter the non-acoustic noise signal to obtain a filtered noise signal, the second secondary path filter defined by a stored transfer characteristic that estimates a secondary path between the loudspeaker and the microphone; and wherein the adaptive filter controller is further programmed to control the controllable filter based on the filtered noise signal and the estimated virtual microphone error signal.

7. The ANC system of claim 6, wherein the at least one sensor comprises at least two sensors, and wherein the adaptive filter controller is further programmed to:

select one of the at least two sensors based on a coherence of the sensor with at least one of the at least one microphone and the at least one virtual microphone; and wherein the second secondary path filter is further configured to filter the non-acoustic noise signal from the selected sensor to obtain a filtered noise signal.

8. The ANC system of claim 1, wherein the at least one virtual microphone further comprises a first virtual microphone and a second virtual microphone, and wherein the occupancy controller can increase a second gain associated with the second virtual microphone in response to an occupant being proximate to the second virtual microphone, without any change in a first gain associated with the first virtual microphone.

9. A method for controlling a virtual microphone (VM) active noise cancellation (ANC) system, the method comprising:

receiving an error signal from a microphone indicative of noise and anti-noise within a vehicle;

receiving an occupancy signal from an occupancy detector indicative of occupant presence within the vehicle;

modifying a transfer function between the microphone and at least one virtual microphone based on the occupancy signal;

increasing a gain associated with the at least one virtual microphone based on occupant presence proximate to the at least one virtual microphone;

filtering the error signal using the transfer function to obtain an estimated virtual microphone error signal; and generating an anti-noise signal to be radiated from a loudspeaker within the vehicle based on the estimated virtual microphone error signal.

10. The method of claim 9, wherein the microphone further comprises at least two microphones, and wherein the method further comprises:

selecting one of the at least two microphones based on the occupancy signal; and filtering the error signal from the selected microphone using the secondary path filter to obtain the estimated virtual microphone error signal.

11. The method of claim 9, wherein the loudspeaker further comprises at least two loudspeakers, and wherein the method further comprises:

selecting one of the at least two loudspeakers based on the occupancy signal; and generating the anti-noise signal to be radiated from the selected loudspeaker within the vehicle based on the estimated virtual microphone error signal.

12. The method of claim 9 further comprising determining a location of the virtual microphone using a head tracking technique.

13. The method of claim 9 further comprising determining a location of the virtual microphone based on a seat position.

14. The method of claim 9, further comprising:

comparing the occupancy signal to a previously stored occupancy configuration to determine any changes between the previously stored occupancy configuration and the occupancy signal.

15. An active noise cancellation (ANC) system comprising:

an occupancy controller configured to modify a transfer function between at least one microphone and at least one virtual microphone based on occupant presence within a passenger cabin of a vehicle;

an adaptive filter controller configured to:

filter an error signal indicative of noise and anti-noise sound within the passenger cabin using the transfer function to obtain an estimated virtual microphone error signal, and increase a gain associated with the at least one virtual microphone in response to an occupant being proximate to the at least one virtual microphone; and a controllable filter to generate an anti-noise signal based on the estimated virtual microphone error signal and to provide the anti-noise signal to at least one loudspeaker to project anti-noise sound within a passenger cabin of a vehicle.

16. The ANC system of claim 15 further comprising:

at least two microphones; and wherein the adaptive filter controller is further configured to:

select one of the at least two microphones based on the occupant presence; and filter the error signal from the selected microphone using the secondary path filter to obtain the estimated virtual microphone error signal.

17. The ANC system of claim 15 further comprising:

at least two loudspeakers; and wherein the adaptive filter controller is further configured to:

select one of the at least two loudspeakers based on the occupant presence; and generate the anti-noise signal to be radiated from the selected loudspeaker within the vehicle based on the estimated virtual microphone error signal.

18. The ANC system of claim 15, wherein the adaptive filter controller is further configured to determine a location of the at least one virtual microphone using a head tracking technique.

19. The ANC system of claim 15, wherein the adaptive filter controller is further configured to determine a location of the at least one virtual microphone based on a seat position.

20. The ANC system of claim 15, wherein the occupancy controller includes predetermined stored data indicative of optimum transfer function parameters for various occupancy configurations.

* * * * *